Dec. 18, 1956 L. H. SOMMER 2,774,778
TRIORGANOSILYL AMINO ACIDS
Filed June 15, 1954
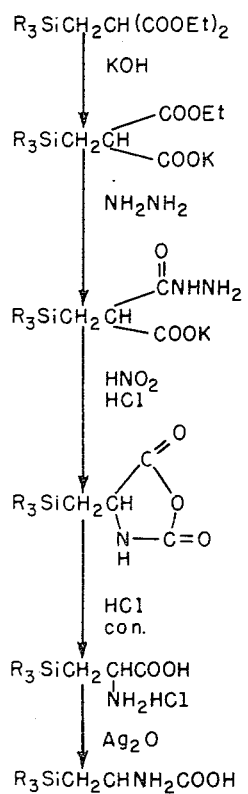
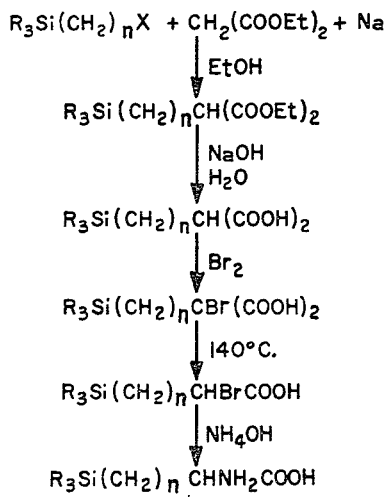
*Fig. 1*  *Fig. 2*
INVENTOR.
LEO H. SOMMER
BY Robert F. Fleming Jr
ATTORNEY United States Patent Office 2,774,778
Patented Dec. 18, 1956

2,774,778

TRIORGANOSILYL AMINO ACIDS

Leo H. Sommer, State College, Pa., assignor to Dow Corning Corporation, Midland, Mich., a corporation of Michigan Application June 15, 1954, Serial No. 436,771

3 Claims. (Cl. 260—448.2)

This invention relates to triorganosilyl substituted amino acids which are useful as surface active agents and as modifiers for organosiloxanes.

The compounds of this invention are of the formula $R_3Si(CH_2)_nCHNH_2COOH$ in which R is a monovalent hydrocarbon radical and $n$ is an integer having a value of 1 or greater than 2.

The compounds of this invention in which $n$ has a value of 1 are best prepared by the series of reactions shown in the flow sheet, Fig. 1. Briefly the general method comprises forming the half ester salt of an ethyl triorganosilylmethylmalonate and thereafter reacting the potassium ester salt with hydrazine to form the potassium hydrazid of the ester salt and thereafter treating the hydrazid salt with nitrous acid to give the azide acid which spontaneously decomposes to an isatoic anhydride which upon treatment with concentrated hydrochloric acid is converted to the hydrochloride of the amino acid which upon treatment with a metal oxide or with pyridine in methanol gives the free amino acids. In Fig. 1, R represents a monovalent hydrocarbon radical.

Those acids of this invention in which $n$ is 3 or greater are best prepared by the general reaction shown in flow sheet, Fig. 2. In this process a trihydrocarbonylhaloalkylsilane is coupled with malonic ester in the normal fashion to give the corresponding malonic ester derivative which is hydrolyzed with alkali to give a triorganosilyl substituted malonic acid which is brominated to give the corresponding α-bromo acid which is decarboxylated by heating to 140° C. or above and then treated with ammonium hydroxide to give the α-amino acids of this invention. In Fig. 2, R represents a monovalent hydrocarbon radical, X is a halogen atom and $n$ is an integer having a value of at least 3.

For the purpose of this invention R can be any monovalent hydrocarbon radical such as, for example, alkyl radicals such as ethyl, propyl and octadecyl; alkenyl radicals such as vinyl, allyl, cyclohexenyl and octadecenyl; cycloaliphatic radicals such as cyclohexyl, cyclopentyl and cyclohexenyl; aryl hydrocarbon radicals such as phenyl, tolyl, xenyl, and naphthyl and alkaryl hydrocarbon radicals such as benzyl.

In the compounds of this invention the amino and carboxyl groups cannot be substituted on a carbon atom β to the silicon. Thus $n$ cannot have a value of 2. However, $n$ can be 1 or any value above 2. For example $n$ can have the values 3, 5, 18 or higher.

The following examples are illustrative only and should not be construed as limiting the invention which is properly set forth in the appended claims.

Example 1

127.1 g. of ethyl trimethylsilylmethylmalonate was mixed with 50 cc. of absolute ethanol. A solution of 29 g. of potassium hydroxide and 500 cc. of absolute ethanol was added to the ester solution and allowed to stand for 1 day. The solution was filtered and most of the ethanol was removed by distillation. The resulting material stood overnight over concentrated sulfuric acid. The weight of the dried product was 129 g. and was shown by silicon analysis and titration to be potassium ethyl trimethylsilylmethylmalonate.

20 g. of 99% hydrazine was added to a solution of 96.8 g. potassium ethyl trimethylsilylmethylmalonate in 50 cc. of absolute ethanol. The mixture was refluxed for 3 hours during which time a white solid precipitate formed. After standing for 3 hours the material was dried overnight in a vacuum desiccator over concentrated sulfuric acid. The remaining alcohol was removed by filtration and the residue washed with absolute ethanol and then with absolute ether. The resulting hydrazid was a solid material having a melting point 213–215° C.

A solution of 20 g. of this potassium hydrazid in 400 cc. of water was combined with a solution of 5.7 g. of sodium nitrite in 50 cc. of water and the resulting solution was mixed with 400 cc. of ether. A solution of 16 g. of concentrated hydrochloric acid in 50 cc. of water was added slowly to the solution with rapid stirring and cooling in an ice water bath. The ether layer was separated and the aqueous layer was extracted with four 100 cc. portions of ether. The combined ether layers were washed with 30 cc. of ice water and dried over anhydrous sodium sulfate. The ether was evaporated and a white solid was obtained which was dissolved in 200 cc. carbon tetrachloride and refluxed for 4 hours. The solution was reduced in volume to 30 cc. and finally evaporated to dryness overnight to give the isatoic anhydride as a yellow-brown, brittle material.

9 g. of the isatoic anhydride was dissolved in 100 cc. of concentrated hydrochloric acid. The mixture was refluxed for 23 hours and the resulting solution was filtered and slowly evaporated. The residue obtained was washed with ice cold concentrated hydrochloric acid and then dried over potassium hydroxide. The dried product was dissolved in absolute hot ethanol and filtered and the alcohol evaporated off in vacuo to give the amino acid hydrochloride as a white crystalline substance. This material was analyzed for silicon and found to contain 14.3 and 14.4% as compared with the theoretical value of 14.2%.

2.57 g. of the amino acid hydrochloride was dissolved in 200 cc. of water and 1.77 g. of freshly prepared silver oxide was added thereto. The mixture was stirred overnight, filtered and finally treated with hydrogen sulfide to precipitate the excess silver. The product was finally filtered and evaporated to dryness on a steam bath. The resulting product was a white crystalline material which decomposed at 180° C. and was found on analysis to contain 17.4 and 17.6% silicon as compared with the calculated value of 17.4. This proves that the material was 2-amino-3-trimethylsilylpropionic acid

($Me_3SiCH_2CHNH_2COOH$)

Example 2

119.1 g. of gamma-bromopropyltrimethylsilane was added to a mixture of 13.8 g. of sodium, 375 cc. of absolute ethanol and 100 g. of ethylmalonate. After reaction was complete the mixture was poured into water and the aqueous layer was extracted with benzene. The combined benzene and ether layers were distilled to give ethyl gamma-trimethylsilylpropylmalonate, B. P. 113° C. at 3 mm. [$Me_3SiCH_2CH_2CH_2CH(COOEt)_2$].

109.5 g. of this malonate was added with stirring to a mixture of 80.5 g. of potassium hydroxide and 80 cc. of water. The mixture was refluxed and stirred for an additional half hour, cooled and the product was evaporated to dryness on a steam bath. The residue was dissolved in 175 cc. of water and cooled to 0° C. in an ice bath. A mixture of 300 cc. of concentrated hydrochloric acid and 100 g. of crushed ice was then added slowly with stirring, keeping the mixture below 10° C. and acid at all times. A white precipitate formed. The mixture was diluted with 600 cc. of water and was then extracted with ether. The combined ether extracts were dried over calcium carbonate.

64.4 g. of bromine was then added to the ether solution at such a rate as to keep the solution refluxing gently. The resulting solution was washed with water and dried over calcium chloride. The ether was removed and the residual oil was decarboxylated by heating at 130–140° C. for 3 hours and overnight at 120° C. The residue was distilled to give α-bromotrimethylsilylvaleric acid (Me₃SiCH₂CH₂CH₂CHBrCOOH) having a neutral equivalent of 252 and 253 as compared with the calculated value of 253.

88 g. of the above α-bromo acid was added slowly with shaking to two liters of ammonium hydroxide. The mixture was allowed to stand for 7 days. The solution was filtered from a small amount of residue and evaporated to dryness on a steam bath. The resulting solid material was treated with a large volume of ice water and filtered. The solid residue thereby obtained was dried and recrystallized from hot water. A white powder was thereby obtained which decomposed at 225° C. This material was proven by analysis for carbon, hydrogen, nitrogen and silicon to be 2-amino-5-trimethylsilylvaleric acide (Me₃SiCH₂CH₂CH₂CHNH₂COOH).

*Example 3*

When the silane (C₆H₅)(C₂H₃)(C₃H₇)Si(CH₂)₁₈Cl is employed in the series of reactions of Example 2, the amino acid (C₆H₅)(C₂H₃)(C₃H₇)Si(CH₂)₁₈CHNH₂COOH is obtained.

That which is claimed is:
1. A compound of the formula

R₃Si(CH₂)ₙCHNH₂COOH in which R is a monovalent hydrocarbon radical and *n* is an integer other than 2.
2. Me₃SiCH₂CHNH₂COOH.
3. Me₃Si(CH₂)₃CHNH₂COOH.

References Cited in the file of this patent

UNITED STATES PATENTS 2,589,445     Sommer  ---------------  Mar. 18, 1952